(12) United States Patent
Chen et al.

(10) Patent No.: US 8,019,366 B2
(45) Date of Patent: Sep. 13, 2011

(54) METHOD FOR PROCESSING SHORT MESSAGE AND COMMUNICATION TERMINAL

(75) Inventors: Keping Chen, Shenzhen (CN); Hongxing Li, Shenzhen (CN); Gaoqi Chen, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 667 days.

(21) Appl. No.: 12/040,600

(22) Filed: Feb. 29, 2008

(65) Prior Publication Data

US 2008/0214217 A1 Sep. 4, 2008

(30) Foreign Application Priority Data

Mar. 1, 2007 (CN) .......................... 2007 1 0073423
Feb. 3, 2008 (WO) ................ PCT/CN2008/070256

(51) Int. Cl.
*H04W 4/00* (2009.01)
*G06K 9/00* (2006.01)
*G06F 17/27* (2006.01)

(52) U.S. Cl. ............................ 455/466; 382/181; 704/9

(58) Field of Classification Search ............... 455/412.1, 455/412.2, 414.4, 466, 59; 382/165, 170, 382/182–231; 704/9
See application file for complete search history.

(56) References Cited

U.S. PATENT DOCUMENTS

| | | | | |
|---|---|---|---|---|
| 5,644,656 | A * | 7/1997 | Akra et al. .................... | 382/215 |
| 5,890,103 | A * | 3/1999 | Carus ............................... | 704/9 |
| 6,216,102 | B1 * | 4/2001 | Martino et al. .................. | 704/9 |
| 2004/0196866 | A1 * | 10/2004 | Park et al. ..................... | 370/466 |
| 2004/0203946 | A1 | 10/2004 | Wu et al. | |
| 2008/0214217 | A1 | 9/2008 | Chen et al. | |

FOREIGN PATENT DOCUMENTS

| | | |
|---|---|---|
| CN | 1472947 A | 2/2004 |
| CN | 1627851 | 6/2005 |
| CN | 1674698 A | 9/2005 |
| CN | 1682547 A | 10/2005 |
| CN | 101022591 A | 8/2007 |
| CN | 100512556 C | 7/2009 |
| EP | 1 717 668 A1 | 11/2006 |
| GB | 2 412 191 A | 9/2005 |
| JP | 2002024188 A | 1/2002 |
| KR | 20040079160 A | 9/2004 |
| WO | WO 02/07441 A1 | 1/2002 |
| WO | WO 2008/104126 A1 | 9/2008 |

OTHER PUBLICATIONS

Office Action issued in corresponding Chinese Patent Application 200710073423.6; issued Jul. 4, 2008.
Extended European Search Report issued in corresponding European Patent Application No. 08152154.4, mailed Jul. 1, 2008.
First Office Action issued in corresponding Chinese Patent Application No. 200710073423.6, mailed Jul. 4, 2008.

* cited by examiner

*Primary Examiner* — George Eng
*Assistant Examiner* — Chayce Bibbee
(74) *Attorney, Agent, or Firm* — Brinks Hofer Gilson & Lione

(57) ABSTRACT

A method for processing a short message and a communication terminal are disclosed. The method includes: receiving a short message; extracting schedule information from the short message after determining that the short message is a schedule short message; and importing the schedule information into a schedule table. The inventive solution enables the communication terminal to automatically identify the schedule short message upon receipt of the short message and imports such schedule short message into the schedule table without manually operating by the user, thereby improving the user experience and increasing the inner value of the communication device.

13 Claims, 2 Drawing Sheets

METHOD FOR PROCESSING SHORT MESSAGE AND COMMUNICATION TERMINAL

RELATED APPLICATIONS

The present invention claims priorities to a Chinese Patent Application No. 200710073423.6 filed on Mar. 1, 2007 and entitled "Method for Processing Short Message and Communication Terminal" and a International Patent Application No. PCT/CN2008/070256 filed on Feb. 3, 2008 and entitled "Method for Processing Short Message and Communication Terminal", the contents of which are incorporated herein by reference in their entity.

FIELD OF THE INVENTION

The present invention relates to the field of communication technologies, and more particularly to a technology for a communication terminal to process a short message.

BACKGROUND OF THE INVENTION

The short message function of mobile terminals brings the users a communication approach other than the voice communication approach. The users may transmit a text or multimedia message by means of the Short Messaging Service (SMS), thus the users' requirements may be satisfied better. With the development of telecommunication technologies, fixed terminals are also provided with the short message function, and the short messaging service has become one of the primary value-added services provided by the telecommunication operators.

In a user's daily life, he may often receive various messages for notifying the schedule of attending a meeting or an activity. In general, the user can only read the message to memorize the relevant schedule in the information.

The conventional mobile terminals generally have a schedule reminding function. The terminal reminds the user upon the arrival of a scheduled time. When receiving a schedule-related short message, if the user wants to place the schedule information in a schedule table within the communication terminal, he has to reenter the schedule information according to the contents of the short message. However, during the implementation of the present invention, the inventor finds after research that in the above prior art, the user can't directly save a schedule-related short message into the schedule table of the terminal upon receipt of the short message, but has to set the schedule table according to the contents of the short message.

Among the conventional technical solutions, there is also a solution which integrates the schedule function with the short message function. In a mobile terminal with the short message function and the schedule function, when sending a schedule-related short message, the mobile terminal needs to convert a schedule data format into a short message data format specific to the recording of the schedule and then send the short message. When receiving a schedule-related short message, the mobile terminal needs to convert the short message data format specific to the recording of the schedule into the schedule format and then records the schedule. During the implementation of the present invention, the inventor finds after research that in the above prior art, the transmission of schedule information between users requires the terminals to support the same format, resulting in a limitation in application.

SUMMARY OF THE INVENTION

Some embodiments of the present invention provide a method for processing a short message and a communication terminal, which allow the short message received by a communication terminal to be directly imported into a schedule table of the communication terminal.

To achieve the above objection, the embodiments of the present invention employ the following technical solutions.

A method for processing a short message is provided. The method includes: receiving a short message, extracting schedule information in the short message after determining that this short message is a schedule short message, and importing the schedule information into a schedule table.

A communication terminal is also provided. The communication terminal includes a short message receiving and sending module, a received short message storage module and a schedule table module. The communication terminal further includes: a schedule short message determining module, adapted to receive a short message transferred by the short message receiving and sending module, determine whether the short message is a schedule short message, and extract schedule information from the schedule short message; and a schedule table import interface module, adapted to receive the schedule information transferred by the schedule short message determining module and import the schedule information into the schedule table module.

The communication terminal according to some embodiments of the present invention obtains and analyzes the text of the short message. When it is determined that the short message is a schedule short message, the communication terminal obtains the schedule information from the short message and imports the schedule information into the schedule table of the communication terminal. In this way, the communication terminal may identify the schedule short message automatically upon receipt of the short message and import the schedule short message into the schedule table automatically, without manually operating and setting the schedule table by the user according to the text of the schedule short message or performing a format conversion on the schedule short message. Some embodiments of the present invention may provide the user of the communication terminal with good user experience and increase the inner value of the communication device.

DETAILED DESCRIPTION OF THE DRAWINGS AND THE PRESENTLY PREFERRED EMBODIMENTS

Some embodiments of the present invention provide a method for processing a short message and a communication terminal. Upon receipt of a short message, the communication terminal obtains and analyzes the text of the short message to determine whether the short message is a schedule short message. If it is determined that the short message is a schedule short message, the communication terminal obtains schedule information from the short message and imports the schedule information into a schedule table of the communication terminal.

The present invention is detailed in conjunction with the following embodiments and accompanying drawings to make the object, solutions and advantages of the present invention more apparent. It should be appreciated that the specific embodiments are described herein only to explain but not to limit the present invention.

Figure 1:
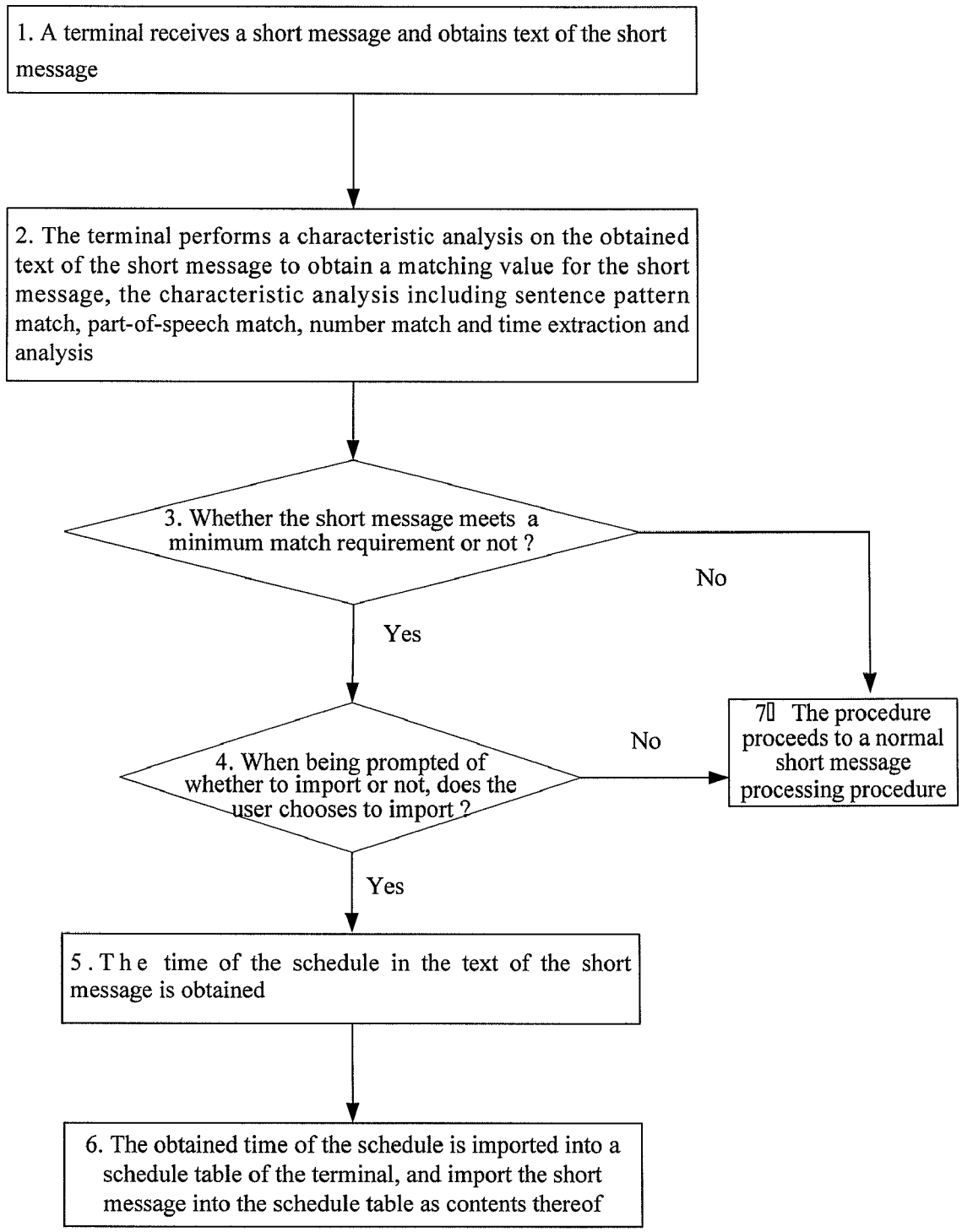
FIG. 1 is a flow chart illustrating a method according to an embodiment of the present invention.

FIG. 1 shows a flow chart of a method according to an embodiment of the present invention. The method includes the following processes.

1: A terminal obtains text of a short message upon receipt of the short message.

2: The terminal performs a characteristic analysis on the text of the short message and obtains a matching value for the short message.

Specifically, the terminal compares the received short message with a predefined template to perform the characteristic analysis. The predefined template may be a sentence pattern template, a number or a time format, and the like. The following method may be used to obtain the matching value of the short message.

Firstly, the terminal performs a sentence pattern analysis on the received short message. The terminal matches the text of the short message with daily used schedule sentence patterns such as "Please go to XXX to attend XXX on XXX", "XXX is arranged to be XXX at XXX on time", "XXX is to be held on XXX at XXX", "XXX, please XXX on time, XXX address XXX", "Meeting: XXXX Address: XXX", "XXX will be hold at XXX-XXX", and "XXX don't forget to attend to XXX at XXX". The various sentence patterns each are provided with a matching value.

In addition, a part-of-speech matching check may be set for the content "XXX" in the sentence patterns. If the "XXX" in the sentence patterns is a noun and that in the text of the short message is also a noun, the matching value is increased according to a preset deviation matching tolerance, and otherwise the matching value is decreased.

For instance, the matching value of the sentence pattern "Please go to XXX on XXX to attend XXX" may be set as 50. The first XXX should be a location name, the second XXX should be a time, and the third XXX should be a noun with a definitive word such as "XXX meeting", "XXX forum" and "XXX discussion". The deviation matching tolerance of each word is set as 10.

If the sentence pattern of the received short message is matched with the above template, an initial matching value 50 is obtained. Then the part-of-speech matching is performed. If one of the three XXXs accords with a preset part-of-speech, the matching value is increased by 10. Otherwise, the matching value is decreased by 10.

After the sentence pattern analysis, a number match may be performed to further improve the matching accuracy. The user may pre-define that short messages from some numbers are schedule short messages by default, or the user may also define that short messages from some numbers are schedule short messages at a percent of X by default. According to these definitions, the value of the percent of X (X is greater than or equal to 0, and less than 100) is mapped to a deviation matching value.

For instance, if it is obtained by preset or history statistics that 30% of the short messages sent from an incoming call number are schedule short messages, and the matching share for the incoming call number is set as 60, then 18 (60*30%) is taken as the deviation matching value and added to the initial matching value.

For example, if a text short message "Please go to Hangzhou on Jan. 1, 2006 to attend the year-end summary conference" is sent from 13888888888, the following may be obtained according to the above preset values: in the sentence pattern match, the matching value is 50; in the first XXX match, the matching value is 60; in the second XXX match, the matching value is 70; in the third XXX match, the matching value is 80; assuming that 1% of the short messages sent from 13888888888 are schedule short messages, then the modified matching value is 80.6.

After a matching value is obtained through the sentence pattern analysis and the number match, to further improve the accuracy of the match, the time contained in the short message may be obtained and various time formats such as "2006-12-6", "Dec. 5, 2006", "2006/12/05", "05/12/2006", "Dec. 5, 2006", "5-12-2006", "forty past eight", "8:40", "eight forty", "AM 8:40" may be analyzed by the conventional regular text matching approach.

For instance, if a received short message contains an expression "2006-12-12", the regular text matching approach may be used to determine whether this expression represents a time. The expression "2006-12-12" may be preliminarily determined as a time according to one of the predefined matching rules, i.e. "four digits (1900-2500)-one or two digits (1-12)-one or two digits (0-31)".

If it is determined that the short message contains a time, a preset deviation matching value may be further added to the above matching value. If it is failed to obtain a time, the above matching value is decreased by a preset deviation matching value. After these operations, a final matching value may be obtained.

In an embodiment of the present invention, firstly the sentence pattern match is performed to obtain a matching value, and then the part-of-speech match, the time format match and the match of the number sending the short message are performed to adjust the obtained matching value. In practical application of the solution according to some embodiments, the sentence pattern match, the time format match and the match of the number sending the short message may be used separately or in any combination thereof.

The above sentence pattern match, number match and time format match may be implemented by an intelligent adaptive method, and the matching values of the sentence pattern templates, the deviation matching value for the part-of-speech match and the minimum matching tolerance for schedule short message may be adjusted dynamically according to the feedback of the user.

actual text of the short message to verify the determining result. For example, if it is determined that the received short message in a certain sentence pattern is a schedule short message while the short message is actually not a schedule short message, the user may properly decrease the matching value or deviation matching value of this sentence pattern in the sentence pattern analysis on the basis of the fact, so as to make a dynamic adjustment to the above determining procedure.

3: Whether the short message meets a minimum matching requirement or not is determined. If meeting the requirement, the short message is a schedule short message and the procedure forwards to process 4. Otherwise the procedure forwards to process 7.

Specifically; the determining process includes the following sub-processes. The final matching value obtained in process 3 is compared with a preset minimum matching value for schedule short message. If the final matching value is greater than or equal to the minimum matching value, it is determined that the short message is a schedule short message, while if the final matching value is less than the minimum matching value, it is determined that the short message is not a schedule short message.

If the minimum matching value is preset as 60, a short message with a final matching value greater than or equal to 60 is a schedule short message and the one with a final matching value less than 60 is not a schedule short message. The final matching value of the short message in process 3 is 80.6 regardless of the result of the time format match, therefore it may be determined that this is a schedule short message.

4: The terminal prompts the user whether to import or not. If the user chooses to import, the process forwards to process 5. Otherwise, the process forwards to process 7.

5: The terminal obtains the time of the schedule in the text of the short message. According to one embodiment of the present invention, the time of the schedule in a short message may be obtained by the terminal immediately after the terminal determines that this short message is a schedule short message, without prompting the user whether to import or not.

6: The terminal imports the obtained time of the schedule into a schedule table of the terminal, and imports the short message into the schedule table as contents of the schedule. The importing may be performed manually by the user or automatically by the terminal.

For instance, if the short message reads "Please go to Hangzhou on 2006-12-12 to attend the annual work conference", the time "2006-12-127" and the text "Please go to Hangzhou on 2006-12-12 to attend the annual work conference" are obtain and imported into the schedule table, thereby creating a schedule record in the schedule table.

During the process of importing manually by the user, the user may also edit or modify the extracted time and contents of the schedule according to his own requirements and import the edited or modified contents into the schedule table.

The obtaining of time as an example of the obtaining of the schedule information is described in this embodiment. However, in other embodiments, elements of the schedule such as time, location, schedule title and schedule contents may be extracted and imported into the schedule table of the terminal respectively.

7: The procedure proceeds to a normal short message processing procedure. In other words, the short message is sent to a received short message storage module to be stored.

It may be appreciated by an ordinary skilled person in the art that all or portions of the processes in the method according to the above embodiment may be implemented by instructing related hardware via a program. The program may be stored in a computer-readable storage medium such as a ROM/RAM, a diskette or a compact disc.

Figure 2:
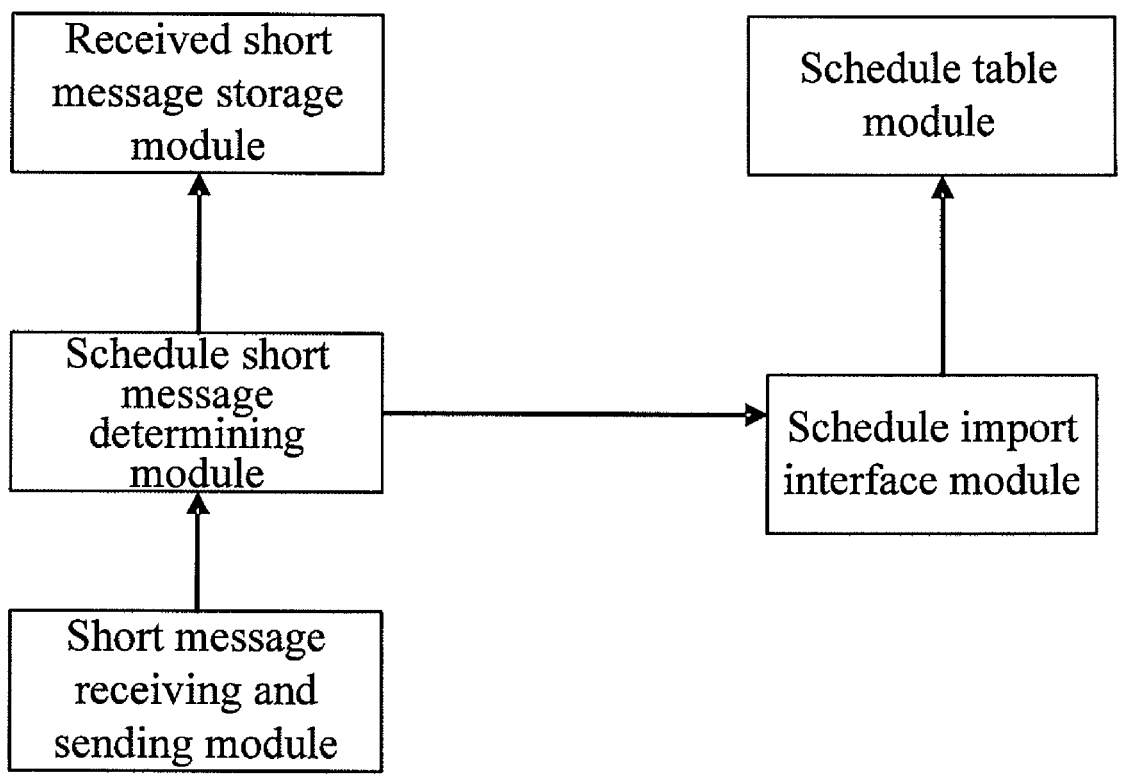
FIG. 2 is a schematic structure diagram illustrating a communication terminal according to an embodiment of the present invention.

FIG. 2 shows a schematic structure diagram of a communication terminal according to an embodiment of the present invention. The communication terminal includes a short message sending and receiving module, a schedule short message determining module, a schedule import interface module, a schedule table module and a received short message storage module.

The short message sending and receiving module is configured to receive and send a short message, and transfer the received short message to the schedule short message determining module.

The schedule short message determining module is configured to receive the short message and determine whether the short message is a schedule short message or not. If determining that the short message is a schedule short message, the schedule short message determining module triggers the schedule import interface module to process the short message. Otherwise, it triggers the received short message storage module to process the short message.

The schedule import interface module is configured to import the short message into the schedule table module for storing.

The received short message storage module is adapted to store the short message.

The schedule short message determining module stores a sentence pattern for schedule short messages. When determining whether a short message is a schedule short message or not, the schedule short message determining module matches the sentence pattern of the text of the short message with the schedule sentence pattern by a sentence pattern analysis approach to obtain a matching value. If the accuracy of the match is required to be further improved, the schedule short message determining module may perform operations including a part-of-speech match, a number match and a time format match to obtain a modified matching value as a final matching value, and then compare the final matching value with a preset minimum matching requirement. If the final matching value meets the minimum matching requirement, the schedule short message determining module determines that the short message is a schedule short message. Otherwise, the schedule short message determining module processes the short message as an ordinary short message.

As described above, the embodiments of the present invention describe a method for processing a short message and a communication terminal. The communication terminal analyzes the obtained the text of the short message to determine whether the short message is a schedule short message. When it is determined that the short message is a schedule short message, the communication terminal obtains the schedule information from the schedule short message and imports the schedule information into the schedule table of the terminal. In this way, the communication terminal is capable of identifying the schedule short message automatically upon receipt of the short message and imports the schedule short message into the schedule table automatically, without manually setting the schedule table by the user according to the text of the schedule short message. This may provide a good user experience to the user of the communication terminal and increase the inner value of the communication device. Moreover, the determining of the short message type and the determining of the importing after receiving the short message may be performed directly by the communication terminal, without performing a format conversion or operating annually by the user, thereby facilitating the user to use this function and avoiding limitation of the terminal type.

The preferred embodiments have been described above to explain but not limit the present invention. Any modifications, equivalent alternations and improvements to the present invention within the spirit and principle of the present invention should be included in the scope of the present invention.

The invention claimed is:

1. A method for processing a short message, comprising:
   receiving a short message;
   obtaining text from the short message;
   matching the text of the short message with daily used schedule sentence patterns, wherein each of the daily used schedule sentence patterns are provided with a matching value;
   obtaining the matching value according to a matching result;
   matching a part-of-speech of certain content in the daily used sentence patterns with text content in the short message, wherein a location of the certain content in the daily used sentence patterns is same as a location of the text content in the short message;

increasing the matching value to obtain a final matching value if the part-of-speech of the certain content in the daily used sentence patterns is same as the part-of-speech of the text content in the short message; or decreasing the matching value to obtain a final matching value if the part-of-speech of the certain content in the daily used sentence patterns is different from the part-of-speech of the text content in the short message;

comparing the final matching value with a preset minimum matching requirement to determine whether the short message is a schedule short message;

determining that the short message is a schedule short message if the final matching value matches the minimum matching requirement, and obtaining schedule information from the short message; and importing the schedule information into a schedule table.

2. The method according to claim 1, further comprising:
matching a number sending the short message with a preset number; and
adjusting the matching value according to a result of the matching.

3. The method according to claim 1, further comprising:
performing a time format match on the text contents, and adjusting the matching value according to a result of the time format matching.

4. The method according to claim 1, wherein the obtaining the schedule information in the short message and importing the schedule information into the schedule table comprises:
obtaining a time in the text of the short message; and
importing the obtained time into the schedule table as a time of the schedule and importing the text of the short message into the schedule table as contents of the schedule.

5. The method according to claim 4, further comprising:
modifying the obtained time and/or contents of the schedule prior to importing the time and/or contents of the schedule into the schedule table.

6. The method according to claim 1 further comprising:
modifying the matching value according to feedback from a user.

7. The method according to claim 1, further comprising:
modifying the matching value according to feedback from a user.

8. A communication terminal, comprising:
a short message receiving and sending module;
a received short message storage module and a schedule table module;
a schedule short message determining module, configured to:
  receive a short message transferred by the short message receiving module,
  obtain text from the short message,
  match the text of the short message with daily used schedule sentence patterns,
  obtain a matching value according to a matching result,
  match a part-of-speech of certain content in the daily used schedule sentence patterns with text content in the short message,
  increase the matching value to obtain a final matching value if the part-of-speech of certain content in the daily used schedule sentence patterns is same as the part-of-speech of text content in the short message or decrease matching value; obtain a final matching value if the part-of-speech of certain content in the daily used schedule sentence patterns is different from the part-of-speech of text content in the short message,
  compare the final matching value with a preset minimum matching requirement to determine whether the short message is a schedule short message based on whether the final matching value meets the minimum matching requirement, wherein each of the daily used schedule sentence patterns are provided with a matching value and the location of the certain content in the sentence patterns is same with the location of the text content in the short message;
a sending module, determine that the short message is a schedule short message if the final matching value matches the minimum matching requirement, and obtain schedule information from the schedule short message; and
a schedule table import interface module, configured to receive the schedule information transferred by the schedule short message determining module and import the schedule information into the schedule table module.

9. A computer-readable medium having instruction stored thereon which, when operated in a system, cause the system to implement a method for processing a short message, the method comprising:
receiving a short message;
obtaining text from the short message;
matching the text of the short message with daily used schedule sentence patterns, wherein each of the daily used sentence patterns is provided with a matching value;
obtaining the matching value according to a matching result;
matching a part-of-speech of certain content in the daily used sentence patterns with text content in the short message, wherein a location of the certain content in the sentence patterns is same as a location of the text content in the short message;
increasing the matching value to obtain a final matching value if the part-of-speech of certain content in the daily used sentence patterns is same as the part-of-speech of text content in the short message; or decreasing the matching value obtain a final matching value if the part-of-speech of certain content in the daily used sentence patterns is different from the part-of-speech of text content in the short message;
comparing the final matching value with a preset minimum matching requirement to determining whether the short message is a schedule short message;
determining that the short message is a schedule short message if the final matching value meets the minimum matching requirement, and obtaining schedule information from the short message; and
importing the schedule information into a schedule table.

10. A communication terminal, being capable of:
receiving a short message;
obtaining text from the short message;
matching the text of the short message with daily used schedule sentence patterns, wherein each of the daily used sentence patterns is provided with a matching value;
obtaining the matching value according to a matching result;
matching a part-of-speech of certain content in the daily used sentence patterns with text content in the short message, wherein a location of the certain content in the daily used sentence patterns is same as a location of the text content in the short message;
increasing the matching value to obtain a final matching value if the part-of-speech of certain content in the daily used sentence patterns is same as the part-of-speech of text content in the short message; or decreasing the matching value to obtain a final matching value if the part-of-speech of certain content in the daily used sentence patterns is different from the part-of-speech of text content in the short message;

comparing the final matching value with a preset minimum matching requirement to determine whether the short message is a schedule short message;

determining that the short message is a schedule short message if the final matching value meets the minimum matching requirement, and obtaining schedule information from the short message; and importing the schedule information into a schedule table.

11. The communication terminal according to claim 10, capable of:

matching a number sending the short message with a preset number; and adjusting the matching value according to a result of the matching.

12. The communication terminal according to claim 10, capable of:

performing a time format match on the text contents, and adjusting the matching value according to a result of the time format matching.

13. The communication terminal according to claim 10, capable of:

obtaining a time from the text of the short message; and importing the obtained time into the schedule table as a time of the schedule and importing the text of the short message into the schedule table as contents of the schedule.

\* \* \* \* \*